US011628946B2

(12) United States Patent
Coupard et al.

(10) Patent No.: US 11,628,946 B2
(45) Date of Patent: Apr. 18, 2023

(54) ON-BOARD TANK FOR THE DRAINAGE OF AN AIRCRAFT ENGINE

(71) Applicant: SAFRAN AIRCRAFT ENGINES, Paris (FR)

(72) Inventors: Josselin Xavier Coupard, Moissy-Cramayel (FR); Alméric Pierre Louis Garnier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/251,356

(22) PCT Filed: Jun. 14, 2019

(86) PCT No.: PCT/FR2019/051447
§ 371 (c)(1),
(2) Date: Dec. 11, 2020

(87) PCT Pub. No.: WO2019/239075
PCT Pub. Date: Dec. 19, 2019

(65) Prior Publication Data
US 2021/0245891 A1    Aug. 12, 2021

(30) Foreign Application Priority Data

Jun. 14, 2018 (FR) .................................. 1855221

(51) Int. Cl.
*B64D 37/20*    (2006.01)
*F01M 11/04*    (2006.01)
(52) U.S. Cl.
CPC .......... *B64D 37/20* (2013.01); *F01M 11/0458* (2013.01); *F01M 2011/0466* (2013.01);
(Continued)

(58) Field of Classification Search
CPC ........ F01M 2011/0466; F01M 11/0458; B64D 37/20; F16N 2200/12
See application file for complete search history.

(56) References Cited

U.S. PATENT DOCUMENTS 5,263,445 A * 11/1993 Bedi .................. F01M 11/0458
                                                        123/196 S
5,964,318 A * 10/1999 Boyle .................... F01M 11/04
                                                        123/196 S
(Continued)

FOREIGN PATENT DOCUMENTS

EP      2014877 B1    3/2013
JP      H0820031 A    8/1996
(Continued)

OTHER PUBLICATIONS

Search Report dated Feb. 7, 2019, in FR Application No. 1855221 (2 pages).
(Continued)

*Primary Examiner* — Kevin A Lathers
(74) *Attorney, Agent, or Firm* — Bookoff McAndrews, PLLC

(57) ABSTRACT

The invention relates to the field of aeronautical propulsion, and more particularly an on-board drainage reservoir of an aircraft engine, the on-board reservoir including a first compartment with a first intake passage for receiving fluid drained from the engine, a first closeable emptying passage, and a first quality sensor assembly for detecting at least one quality parameter of the fluid drained from the engine.

9 Claims, 1 Drawing Sheet

(52) U.S. Cl.
CPC ...... *F16N 2200/12* (2013.01); *F16N 2210/02* (2013.01); *F16N 2250/18* (2013.01); *F16N 2250/36* (2013.01)

(56) References Cited

U.S. PATENT DOCUMENTS

| | | | |
|---|---|---|---|
| 9,181,868 | B2 | 11/2015 | Weinzierl et al. |
| 2006/0214054 | A1 | 9/2006 | Fuerlinger et al. |
| 2016/0061805 | A1 | 3/2016 | Prabhu et al. |
| 2016/0312707 | A1 | 10/2016 | Py et al. |
| 2018/0045367 | A1 | 2/2018 | Raimarckers et al. |

FOREIGN PATENT DOCUMENTS

| | | |
|---|---|---|
| JP | 3445007 | 9/2003 |
| WO | WO 2015/082833 A1 | 6/2015 |

OTHER PUBLICATIONS

International Search Report issued in International Application No. PCT/FR2019/051447 dated Sep. 20, 2019 (2 pages).

"CH-47 Chinook Helicopter, Student Handout, Powerplant T55-GA-714A", Mar. 22, 2007, available from: www.chinook-helicopter.com/standards/Classes/GA-714 Student Handout 22 March 2007.doc.

A330 Aircraft Characteristics Airport and Maintenance Planning, Airbus, Issue: Jan. 1993, Revised in Jul. 2021, available from: https://www.airbus.com/sites/g/files/jlcbta 136/files/2021-11/Airbus-Commercial-Aircraft-AC-A330.pdf.

An excerpt of "Systems of Commercial Turbofan Engines", published 2008, available from: https:/ /beckassets.blob.core.windows.net/product/readingsample/159440/9783540736189excerpt001.pdf.

CH-47D Aft Transmission Lubrication Diagram, available from: https://web.archive.org/web/201200122072454/http://www.chinook-helicopter.com: SO/standards/areas/aftxmsn. html.

CH-47D Engine Transmission Lubrication System, available from: https://web.archive.org/web/20120508022502/http://www.chinook-helicopter.com/standards/areas/engxmsn.html.

Notice of Opposition issued in European Application No. 3810510 dated Jan. 18, 2023 (23 pages).

Training Manual A319 | A320 | A321, Issue: Jul. 1999, Lufthansa technical training, available from: https://www.metabunk.org/attachments/docslide-us-a-320-engine.pdf.16733.

* cited by examiner

ON-BOARD TANK FOR THE DRAINAGE OF AN AIRCRAFT ENGINE

CROSS-REFERENCE TO RELATED APPLICATION(S)

This application is the U.S. national phase entry under 35 U.S.C. § 371 of International Application No. PCT/FR2019/051447, filed on Jun. 14, 2019, which claims priority to French Patent Application No. 1855221, filed on Jun. 14, 2018.

BACKGROUND OF THE INVENTION

The present disclosure relates to the field of aeronautical propulsion, and more particularly an on-board drainage reservoir of an aircraft engine.

In the present context, what is meant by an "aircraft engine" is any propulsor carried on-board an aircraft and intended for its flight propulsion, in particular gas turbine engines, such as for example turbojet, turbofan, turboprop or turboshaft engines, but also piston engines or electric motors.

Normally, aircraft engines comprise moving parts subjected to high mechanical and thermal stresses. It is therefore generally important to supply with lubricating fluid certain elements of the engine, particularly rotating shaft support bearings. In addition, aircraft engines can also comprise hydraulic actuators, which can in particular use fuel as a hydraulic fluid and/or as a lubricant. A portion of these fluids can escape by evaporation or liquid flow, and represents a potential source of environmental pollution. Thus, to reduce or avoid this pollution, on-board reservoirs have been proposed, in particular in the publication of the international patent application WO 2015/082833 A1, for receiving fluids drained from the engine, and contain them until their controlled emptying.

In addition, in order to monitor the condition of an engine, and particularly of its lubricating fluid, it is known to proceed with analyses of this lubricating fluid. However, this usually requires the collection of samples of the lubricating fluid of the engine, and their transport to an analysis device, which can be difficult when this engine is carried on board an aircraft.

Finally, it is also known to integrate lubricating fluid quality sensors directly into the lubrication circuit of an aircraft. However, this integration can be difficult due to the necessity of maintaining the circulation of the lubricating fluid through this circuit.

OBJECT AND SUMMARY OF THE INVENTION

The present disclosure aims to correct these disadvantages, by proposing an on-board aircraft engine drainage reservoir which allows constant monitoring of the condition of the engine, even in flight, by means of the quality of its operating fluids, with accuracy and without interfering with the circulation of these fluids within the engine.

According to a first aspect, this aim can be achieved thanks to the fact that at least one first compartment of this on-board reservoir, which comprises a first intake passage for receiving the fluid drained from the engine, and a first closeable emptying passage, also comprises a first quality sensor assembly for detecting at least one quality parameter of the fluid drained from the engine. This first quality sensor assembly can in particular comprise an optical sensor and/or an acoustic sensor. This optical or acoustic sensor can be configured to carry out a measurement of the transmission, absorption, reflection and/or refraction of the fluid contained in the on-board reservoir, over one or more wavelengths, particularly in order to characterize the composition, decantation and/or stratification of this fluid in the on-board reservoir. Moreover, the first quality sensor assembly can also comprise an electrical conductivity sensor, particularly to contribute to the detection of water and/or other pollutants in the fluid drained from the engine.

Thanks to the installation of the first quality sensor assembly in the first compartment of the on-board reservoir, it is thus possible to carry out monitoring of the condition of the engine, and in particular but not solely of its lubricating fluid, by means at least of the quality of the fluid drained naturally from the engine, this therefore without having to interfere further in the circulation of the operating fluids within the engine.

In addition, the first compartment can include a first level sensor for detecting a fluid level in the first compartment. Thus, it is possible to monitor, not only the quality of the drained fluid, but also its quantity, thus allowing the identification of possible blockages and/or leakage in its circulation within the engine, and possibly the triggering of an emptying of the first compartment beyond a predetermined fluid level.

The reservoir can also include at least one additional sensor, which can be situated outside the first compartment, and particularly upstream of it, and can for example comprise a viscosity sensor and/or a ferromagnetic particle sensor, in order in particular to also contribute to the detection of water and/or to the characterization of solid particles in suspension in the fluid drained from the engine.

To also avoid the level of fluid in the first compartment becoming excessive, the first compartment can also include a first overflow pipe.

Aside from the first compartment, the on-board reservoir can also include at least one second compartment with a second intake passage for fluid drained from the engine, a second closeable emptying passage, and a second quality sensor assembly for fluid drained from the engine. It can thus be possible to separately receive and monitor the fluid received through the first intake passage, and that received through the second, these fluids being able to be of different types (for example, lubricant and fuel) or originate in different portions of the engine. The sensor(s) of the second quality sensor assembly can also be selected among the types previously mentioned for the first quality sensor assembly, and the second compartment can also further comprise its own level sensor and/or overflow pipe. Moreover, the on-board reservoir can also include another compartment connected, downstream of the first and second compartments, to the first and second closeable emptying passages. Consequently, after separate analyses of the fluids in the first and second reservoirs, these can be emptied into this other compartment, to be stored their until a possible emptying and/or to perform other analyses with another quality sensor assembly, which can also comprise one or more sensors selected among the types previously mentioned for the first quality sensor assembly, and this other compartment can also further comprise its own level sensor, overflow pipe and/or closeable emptying passage.

A second aspect of the present disclosure relates to a method for monitoring a fluid of an aircraft engine, including a step of draining the fluid from the engine to a first compartment of the on-board reservoir, including a step of draining the fluid from the engine, to a second compartment of the on-board reservoir, by means of at least one first intake passage, a step of detecting, by means of a first quality sensor assembly, of at least one quality parameter of the fluid drained to the first compartment of the on-board reservoir, and a step of emptying the first compartment of the on-board reservoir by means of a first closeable emptying passage.

BRIEF DESCRIPTION OF THE DRAWINGS

The invention will be better understood and its advantages will appear more clearly upon reading the detailed description that follows, of embodiment shown by way of nonlimiting examples. The description refers to the appended drawings in which.

DETAILED DESCRIPTION OF THE INVENTION

Figure 1:
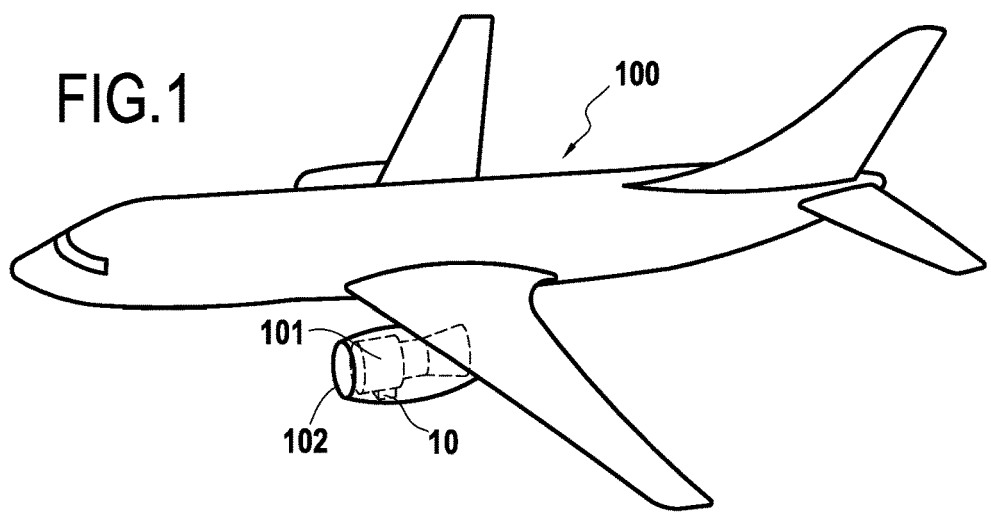
FIG. 1 illustrates schematically an aircraft equipped with an aviation engine with an on-board fluid drainage reservoir according to one embodiment.

FIG. 1 illustrates an aircraft 100 equipped with two engines 101, which can in particular be gas turbine engines, and more particularly turbofans. As in the illustrated embodiment, each of these two engines 101 can be equipped with a on-board drainage reservoir 10, intended to receive fluids drained from the engine 101, such as for example lubricant escaping from the rotating shaft support bearings of the engine 101 and/or fuel escaping from the fuel supply circuit of the engine 101 and/or from actuators using this fuel as a hydraulic fluid. Thus, this reservoir 10 can allow avoiding that these fluids escape outside the engine in an uncontrolled manner, and thus constitute a source of environmental pollution.

To this end, the reservoir 10 can be situated below the engine 101, in a nacelle 102 surrounding it, and have a first compartment 11 with, for example at its vertex, a first intake passage 12 for fluid drained from the engine 101. The fluids escaping from the engine 101 and trickling by gravity inside the nacelle 102 can thus be received, through this first intake passage 12, into this first compartment 11, which can be the only compartment of the reservoir 10, as in the example illustrated in FIG. 2.

To ensure its controlled emptying, the reservoir 10 can also have, for example at the bottom of the first compartment 11, a first emptying passage 13. This first emptying passage 13 can also have a valve 14 with an actuator 15 connected to a control unit 50 for commanding the opening and closing of the first emptying passage 13. However, the closing of the first emptying passage 13 to retain the drained fluid in the first compartment 11 can alternatively be obtained by other means, such as for example a simple stopper. In addition, to avoid uncontrolled overflow of the first compartment 11, this can also include an overflow pipe 16.

The reception of fluids drained from the engine 101 into the reservoir 10 offers an opportunity to monitor continuously the condition of the engine 101 by means of these fluids: in fact, both their nature and their volume can be indicative of this condition. To take advantage of this, the first compartment 11 can also comprise, as in the example illustrated, not only a first level sensor 18 to detect a fluid level in the first compartment, and thereby the quantity of fluid drained from the engine 101, but also a first quality sensor assembly 17 to detect at least one quality parameter of the fluid drained from the engine 101. The first fluid quality sensor assembly 17 can in particular comprise an electrical conductivity sensor, and optical sensor and/or an acoustic sensor. The optical or acoustic sensor can be configured to carry out a measurement of transmission, absorption, reflection and/or refraction of the fluid contained in the on board reservoir, over one or more wavelengths, particularly in order to characterize the composition, decantation and/or stratification of this fluid in the on-board reservoir. Moreover, the first level sensor 18 and the first quality sensor assembly 17, situated in the first compartment 11, can be complemented by at least one additional sensor 19, such as for example a viscosity sensor and/or a ferromagnetic particle sensor, situated outside the first compartment 11 and particularly upstream of it, such as for example in the first intake passage 12, in contact with the dynamic flow of the fluid. It is nevertheless also conceivable to integrate a viscosity and/or ferromagnetic particle sensor in the first quality sensor assembly 17 in the first compartment 11 or in a duct appended to it. The viscosity sensor can for example be a capacitive sensor.

The first level sensor 18, the first quality sensor assembly 17, and the at least one additional sensor 19 can be connected to the control unit 50. The control unit 50 can be configured to determine, based on the data detected by the first level sensor 18, by the first quality sensor assembly 17, and by the at least one additional sensor 19, not only the quality of the fluid drained from the engine 101, but also its physical and/or chemical characteristics, an in particular its suspended pollutant content, including water and/or particles. Moreover, the control unit 50 can comprise an integrated memory for storing these data and be integrated into and/or connected to a prognosis and health management (PHM) system 150 of the engine 101, on-board the aircraft 100 and/or situated on the ground, allowing performing a diagnostic of the engine 101 to direct its predictive maintenance depending on the quantity of fluid drained from the engine 101 and its physical and/or chemical characteristics, as determined by the control unit 50 based on data detected by the level sensor 18, by the first quality sensor assembly 17, and by the at least one additional sensor 19, along or in combination with other factors. The prognosis and health management system 150 can in particular be configured to diagnose a seal failure within the engine 101 and/or excessive wear of moving parts of the engine 101, and possibly recommend a maintenance or inspection operation, immediate or deferred, and/or allow the takeoff of the aircraft 100 depending on this diagnosis.

In operation, the fluids drained from the engine 101 can therefore trickle by gravity inside the nacelle 102, through at least one drainage passage, until the first intake passage 12, through which they penetrated into the first compartment 11 of the on-board reservoir 10. In this first compartment 11, at least one quality parameter of the fluid, such as for example its turbidity and/or its electrical conductivity, could be detected by the first quality sensor assembly 17 and transmitted to the control unit 50. At least one other additional quality parameter of the fluid, such as for example its viscosity or the presence of ferromagnetic particles, could be detected by means of the at least one additional sensor 19 and also transmitted to the control unit 50. Moreover, the fluid level in the first compartment 11 could also be detected, by means of the first level sensor 18, and also transmitted to the control unit 50. This measurement of the fluid level in the first compartment could be performed at regular time intervals in order to establish a volume flow rate of drainage of the fluid over time. The data thus obtained by the first quality sensor assembly 17, the at least one additional sensor 19 and/or the first level sensor 18 could then be evaluated in the control unit 50 to determine physical and/or chemical characteristics of the fluid, and in particular its suspended pollutants content, including water and/or particles. This information can then be transmitted to the prognosis and health management system 150 in order to allow continuous monitoring of the condition of the engine 101, even in flight, and direct its predictive maintenance.

Thus, for example, the data detected by the first quality sensor assembly 17, possibly in combination with those detected by the at least on additional sensor 19, can allow identifying the proportions of lubricant, fuel and water in the fluid drained from the engine 101. The control unit 50, by multiplying these proportions by the total volume of drained fluid, which can be deduced from the data detected by the level sensor 18, can obtain the total volumes of lubricant, fuel and water drained from the engine 101 to the first compartment 11. A seal failure of the lubricated portions of the engine 101, which can in particular affect the quality of the air collected from the engine 101 for the pressurization system of the cabin of the aircraft, can be diagnosed by the prognosis and health management system 150 as a result of the detection of an excessive volume of lubricant in the drained system. The detection of an excessive volume of fuel in the drained fluid, on the other hand, can allow the prognosis and health management system 150 to diagnose a seal failure of the fuel supply circuit and/or in actuators using the fuel as a hydraulic fluid. The data detected by the first quality sensor assembly 17, possibly in combination with those detected by the at least one additional sensor 19, can also allow identifying the quantity and type of solid particles in the fluid drained from the engine 101 to the first compartment 11, distinguishing in particular between ferromagnetic particles and particles rich in carbon. The prognosis and health management system 150 can thus diagnose excessive wear as a result of the detection, by means of the first quality sensor assembly 17 and/or the additional sensor of an excessive quantity of ferromagnetic particles of a size exceeding a predetermined threshold, while poor combustion within a combustion chamber of the engine 101 could be diagnosed by the prognosis and health management system 150 as a result of the detection of an excessive quantity of particles rich in carbon in this same drained fluid. As a result of these diagnostics, the prognosis and health management system 150 can also recommend a maintenance or inspection operation, immediate or deferred, and/or allow takeoff of the aircraft 100 depending on this diagnosis.

Finally, the opening of the valve 14 of the first emptying passage 13 could be commanded by the control unit 50, for example when the aircraft 10 is in a ground emptying station, in order to allow controlled emptying of the first compartment 11. It would however also be conceivable, in an alternative embodiment not having an overflow pipe, to activate this opening and emptying in response to a signal from the first level sensor 18 indicating an excessive level of drained fluid in the first compartment 11.

Figure 2:
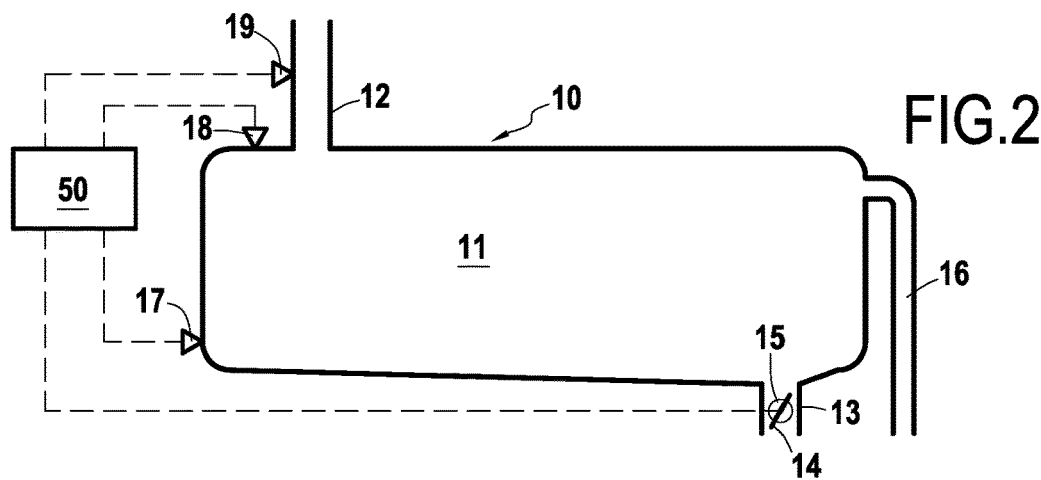
FIG. 2 is a schematic illustration of the on-board reservoir of FIG. 1.
Figure 3:
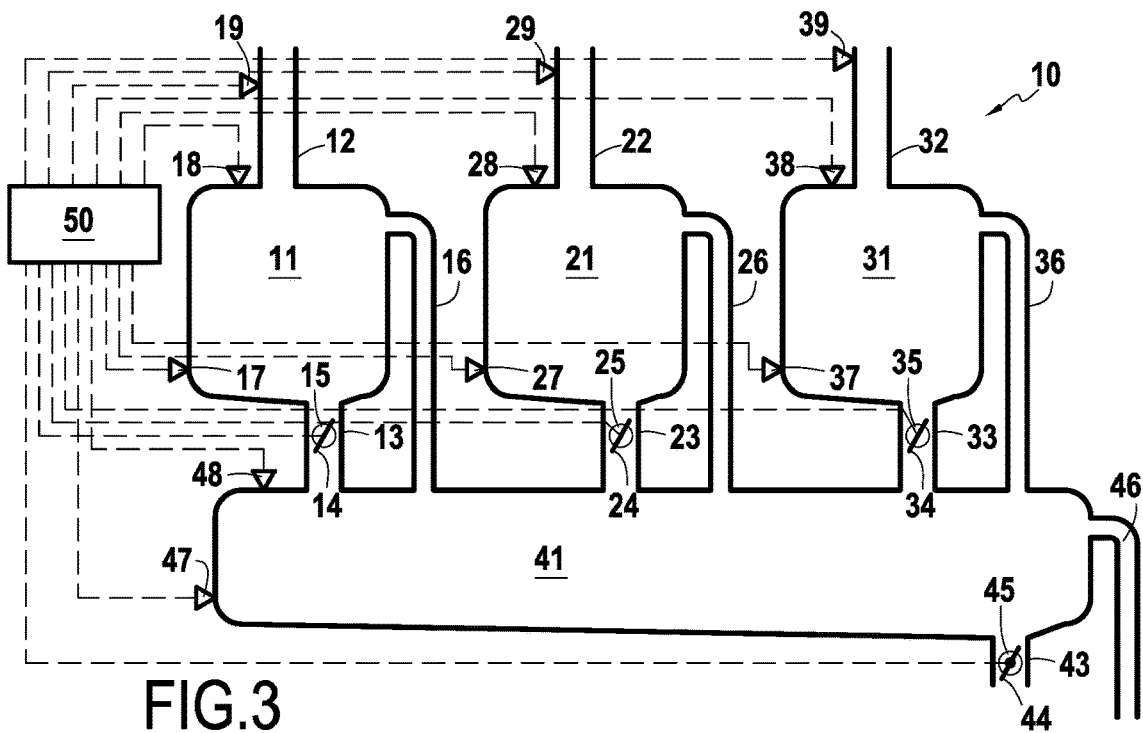
FIG. 3 is a schematic illustration of an on-board reservoir according to a second embodiment.

Although in the embodiment illustrated in FIG. 2 the first compartment 11 is the sole compartment of the on-board reservoir 10, it is also conceivable to divide this on-board reservoir 10 into several compartments 11, 21, 31, 41, as in the example illustrated in FIG. 3, particularly for receiving in different compartments 11, 21, 31, through separate intake passages 12, 22, 32, fluids drained from several different portions of the engine 101, for example through separate emptying ducts, in order to detect separately, by means of the quality sensor assemblies 17, 27, 37, the additional sensors 19, 29, 39, and the corresponding level sensors 18, 28, 38, the volume and at least one quality parameter of the fluids drained from each of these portions of the engine 101 in order to transmit to the control unit 50 more accurate data regarding the condition of the engine 101 for its prognosis and health management. As in the illustrated embodiment, each of the first, second and third compartments 11, 21, 31 of the on-board reservoir 10 can be similar to the first and only compartment 11 of the embodiment illustrated in FIG. 2, and therefore include its own intake passage 12, 22, 32, emptying passage 13, 23, 33 with valve 14, 24, 34 and actuator 15, 25, 35, overflow pipe 16, 26, 36, quality sensor assembly 17, 27, 37, and level sensor 18, 28, 38. As illustrated additional sensors 19, 29, 39, such as for example viscosity sensors and/or ferromagnetic particle sensors can also be separately associated with each of the compartments 11, 21, 31, and installed outside them, and particularly upstream of each of these compartments 11, 21, 31, for example in their respective intake passages 12, 22, 32 or, alternatively, downstream, in respective emptying passages 13, 23, 33. It is however also conceivable, as explained in the context of the embodiment illustrated in FIG. 1, to integrate viscosity and/or ferromagnetic particle sensors into the first second and third quality sensor assemblies 17, 27, 37 in the first, second and third compartments 11, 21, 31 or in ducts appended to each of them. Each actuator 15, 25, 35, quality sensor assembly 17, 27, 37, additional sensor 19, 29, 39 and level sensor 18, 28, 38 can be connected to the control unit 50.

The control unit 50 can be configured to determine, based on the data detected by the first level sensor 18, by the first quality sensor assembly 17, and by the at least one additional sensor 19, not only the quantity of fluid drained from the different portions of the engine 101 to the different respective compartments 11, 21, 31 of the reservoir 10, but also the physical and/or chemical characteristics of the fluid drained to each compartment 11, 21, 31, and in particular its suspended pollutants content, including water and/or particles. Similarly to the example of FIG. 1, the control unit 50 in this alternative example can also moreover comprise an integrated memory for storing these data and be integrated into and/or connected to a prognosis and health monitoring system 150 of the engine 101, carried on-board the aircraft 100 and/or situated on the ground, allowing a diagnostic of the engine 101 to be carried out to direct its predictive maintenance depending on the quantity and the physical and/or chemical characteristics of the fluid drained from each portion of the engine 101 to each compartment 11, 21, 31 of the reservoir 10, as determined by the control unit 50 based on the data detected by the level sensors 18, 28, 38, by the quality sensor assemblies 17, 27, 37, and by the additional sensors 19, 29, 39, alone or in combination with other factors. The prognosis and health monitoring system 150 can in particular be configured to diagnose a seal failure and/or excessive wear of moving parts in specific areas of the engine 101, and possibly recommend a maintenance of inspection operation, immediate or deferred, and/or allow the takeoff of the aircraft 100 depending on this diagnosis.

In addition, as illustrated, apart from these first, second and third compartments 11, 21, 31 disposed in parallel, the reservoir 10 can also comprise an additional compartment 41 disposed downstream of them, in such a manner that all the emptying passages 13, 23, 33, like the overflow pipes 16, 26, 36 of the first, second and third compartments 11, 21, 31 lead into this additional compartment 41. This additional compartment 41 can also have, as illustrated, an emptying passage 43 with valve 44 and actuator 45, an overflow pipe 46, a quality sensor assembly 47, and a level sensor 48. The actuator 45, the quality sensor assembly 47 and the level sensor 47 of the additional compartment 41 can also be connected to the control unit 50.

In operation, fluids drained from different portions of the engine 101 can therefore trickle by gravity inside the nacelle 102, through separate drainage ducts, until the intake passages 12, 22 and 32, through which they penetrate into the corresponding compartments 11, 21, 31 of the on-board reservoir 10. In each of these first, second and third compartments 11, 21 and 31, at least one quality parameter, such as for example electrical conductivity of the fluid originating from a different portion of the engine could be detected by means of the corresponding quality sensor assembly 17, 27, 37, and transmitted to the control unit 50. At least one other additional quality parameter of the fluid drained to each compartment 11, 21, 31, such as for example its viscosity or the presence of ferromagnetic particles, could be detected by means of the additional sensors 19, 29, 39 and also transmitted to the control unit 50. Moreover, the fluid level in each of the first, second and third compartment 11 could also be detected, by means of the corresponding level sensors 18, 28, 38 and also transmitted to the control unit 50. This fluid level measurement in each of the first, second and third compartments could be performed at regular time intervals in order to establish a volume flow rate of fluid drainage from each portion of the engine over time. The data thus obtained by the quality sensor assemblies 17, 27, 37, the additional sensors 19, 29, 39 and/or the level sensors 18, 28, 38 could then be evaluated in the control unit 50 to determine its physical and/or chemical characteristics, and particularly its suspended pollutants content, including water and/or particles. This information can then be transmitted of the prognosis and health management system 150 in order to allow continuous monitoring of the condition of different portions of the engine 101, even in flight, and direct its predictive maintenance, similarly to that which has been described for the example of FIG. 1.

The opening of each of the valves 14, 24, 34 of the first, second and third emptying passage 13, 23, 33 can be commanded, at regular time intervals, by the control unit 50 to empty the additional compartment 41 of the drained fluids contained in the first, second and third compartments 11, 21, 31, and thus prevent their overflow. The overflow pipes 16, 26, 36 can in any case prevent such an overflow even if the level of fluid drainage to one of the first, second or third compartments 11, 21, 31 is so high that it fills before the command to open the corresponding valve 14, 24, 34. It would however also be conceivable, in an alternative embodiment in which the first, second or third compartments 11, 21, 31 would not have overflow pipes, to activate this opening and emptying in response to a signal of the corresponding level sensor 18, 28, 38 indicating an excessive level of drained fluid in the corresponding compartment 11, 21, 31.

The fluid leaving each of the first, second and third compartments 11, 21, 31 through emptying passages 13, 23, 33 or the overflow pipes 16, 26, 36 can be received in the additional compartment 41, which can have a greater capacity for containing all the drained fluid until the next emptying of the on-board reservoir 10 on the ground. Also in this additional compartment 41, at least one quality parameter of the fluid, such as for example its turbidity and/or its electrical conductivity, could be detected by the quality sensor assembly 47 and transmitted to the control unit 50. Moreover, the fluid level in the additional compartment 41 could also be detected by the level sensor 48 and also transmitted to the control unit 50. This measurement of the fluid level in the additional compartment could also be performed at regular time intervals in order to establish a volume flow rate of fluid drainage over time. The data thus obtained by the quality sensor assembly 47 and/or by the level sensor 48 could also be evaluated in the control unit 50 and transmitted to the prognosis and health management system 150 to contribute to the continuous monitoring of the condition of the engine 101.

Finally, the opening of the valves 14, 24, 34 and 44 of the emptying passages 13, 23, 33, 43 could be commanded by the control unit 50, for example when the aircraft 100 is at an emptying station on the ground, in order to allow a controlled emptying of all the compartments 11, 21, 31 and 41 of the on-board reservoir 10. It would however also be conceivable, in an alternative embodiment in which the additional compartment 41 would not have an overflow pipe 46, to command the opening of the valve 44 and thus activate the emptying of the additional compartment 41 in response to a signal from the level sensor 48 indicating an excessive level of drained fluid in the additional compartment 41.

Although the present invention has been described by referring to specific exemplary embodiments, it is obvious that different modifications and changes can be performed on these examples without departing from the general scope of the invention as defined by the claims. In addition, individual features of the different embodiments mentioned can be combined into additional embodiments. Consequently, the description and the drawings must be considered in an illustrative, rather than a restrictive sense.

The invention claimed is:

1. An on-board drainage reservoir of an aircraft engine, the on-board reservoir including a first compartment comprising:
    a first intake passage for receiving fluid drained from the engine,
    a first closeable emptying passage, and
    a first quality sensor assembly, within the first compartment of the on-board reservoir, for detecting at least one quality parameter of the fluid drained from the engine to the first compartment of the on-board reservoir;
    the on-board reservoir further including at least one second compartment with:
    a second intake passage for receiving fluid drained from the engine,
    a second closeable emptying passage, and
    a second quality sensor assembly, within the second compartment of the on-board reservoir, for detecting at least one quality parameter of the fluid drained from the engine to the second compartment of the on-board reservoir; and
    the on-board reservoir further including an additional compartment connected, downstream of the first and second compartments, to the first and second closeable emptying passages.

2. The on-board reservoir according to claim 1, wherein the first quality sensor assembly comprises an optical sensor and/or an acoustic sensor.

3. The on-board reservoir according to claim 1, wherein the first quality sensor assembly comprises an electrical conductivity sensor.

4. The on-board reservoir according to claim 1, wherein the first compartment further includes a first level sensor for detecting a fluid level in the first compartment.

5. The on-board reservoir according to claim 1, further including at least one additional sensor.

6. The on-board reservoir according to claim 5, wherein the at least one additional sensor is situated upstream of the first compartment.

7. The on-board reservoir according to claim 5, wherein the at least one additional sensor comprises a viscosity sensor and/or a ferromagnetic particle sensor.

8. The on-board reservoir according to claim 1, wherein the first compartment further includes a first overflow pipe.

9. A method for monitoring a fluid of an aircraft engine, including the following steps:

draining the fluid from the engine, to a first compartment of an on-board reservoir, by means of at least one first intake passage, detecting, by means of a first quality sensor assembly within the first compartment of the on-board reservoir, at least one quality parameter of the fluid drained to the first compartment of the on-board reservoir, draining the fluid from the engine, to a second compartment of an on-board reservoir, by means of at least one second intake passage, detecting, by means of a second quality sensor assembly within the second compartment of the on-board reservoir, at least one quality parameter of the fluid drained to the second compartment of the on-board reservoir, and emptying the first compartment of the on-board reservoir to an additional compartment by means of a first closeable emptying passage connecting to the additional compartment downstream of the first compartment, and emptying the second compartment of the on-board reservoir to the additional compartment by means of a second closeable emptying passage connecting to the additional compartment downstream of the second compartment.

\* \* \* \* \*